Jan. 31, 1967  N. L. MEYERSON  3,301,049
HEAT QUANTITY METER
Filed June 19, 1964  3 Sheets-Sheet 1

NORMAN L. MEYERSON
INVENTOR.

BY Daniel N. Bobis
Atty

NORMAN L. MEYERSON
INVENTOR.

BY Daniel H. Bobis
Atty

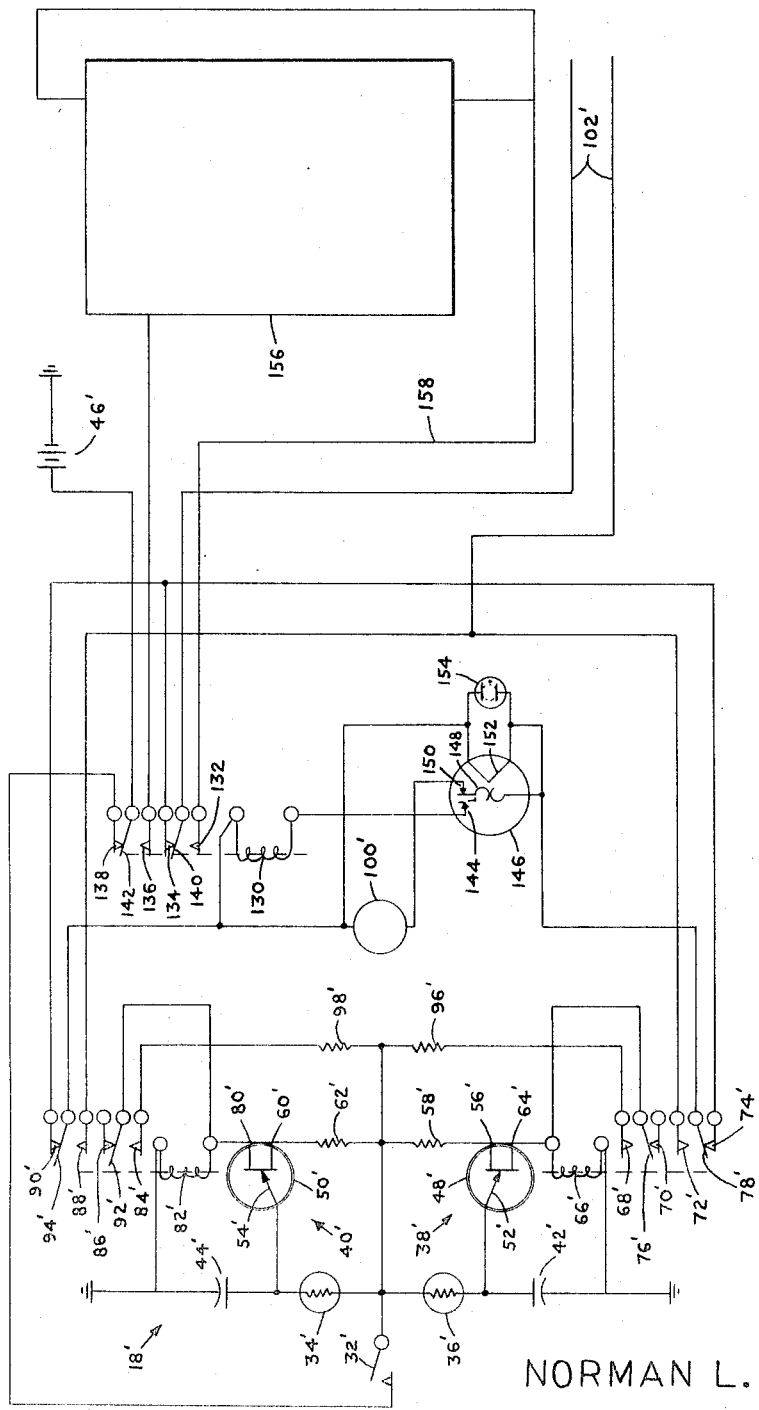

3,301,049
HEAT QUANTITY METER
Norman L. Meyerson, Glen Rock, N.J., assignor to Worthington Corporation, Harrison, N.J., a corporation of Delaware
Filed June 19, 1964, Ser. No. 376,443
11 Claims. (Cl. 73—193)

In general, this invention relates to a new and improved meter for measuring the quantity of heat supplied or removed by a heating or cooling device. More particularly, it is directed to the provision of a new and inexpensive meter for determining the flow of heat for chilled fluid and/or hot fluid apparatus.

With the increase in the use of air conditioning and heating equipment, there has evolved a great need for an inexpensive meter for registering the total energy delivered to or removed from a particular occupied or commerically utilized area. With such a meter, equitable rates could be properly instituted and the particular user charged for his proportional share of the energy supplied to the overall building. Since this means that many rate flow of heat meters must be made available at any given installation, their cost should be economically reasonable with respect to the overall saving intended. Since, at present, the least expensive meters commercially available sell for approximately $600, it will easily be seen that there is an extensive market available for an inexpensive rate flow of heat meter.

This type of meter could be especially useful in measuring the quantity of heat utilized by individual commercial users in apartment buildings, shopping centers, office buildings, central power housing developments, industrial parks, commercial terminals, etc.

Therefore, it is the general object of this invention to provide a new and improved heat meter which is low in cost, accurate, has a long life, and cannot be easily tampered with.

Another object of this invention is the provision of a new and improved heat meter which is adaptable to existing installed flow meters.

Still another object of this invention is the provision of a new and better heat meter whose recorder can be located at any remote location.

A further object of this invention is the provision of a new and better meter for cooling, air conditioning, and heat generating service which is relatively insensitive to ambient temperatures.

A still further object of this invention is the provision of a new and better heat meter which utilizes a minimum of gears, linkages, cams, pawls, ratchets, and other mechanical components.

Another object of this invention is the provision of an inexpensive accurate electronic heat measuring apparatus which will automatically changeover to a stand-by circuit if there is a failure of the main measuring circuit.

Other objects will appear hereinafter.

For the purpose of illustrating the invention, there are shown in the drawings forms which are presently preferred; it being understood, however, that this invention is not limited to the precise arrangements and instrumentailities shown.

FIGURE 3 is another embodiment of the present invention wherein the circuit has been modified to include an alarm system should the measuring apparatus fail.

Figure 1:
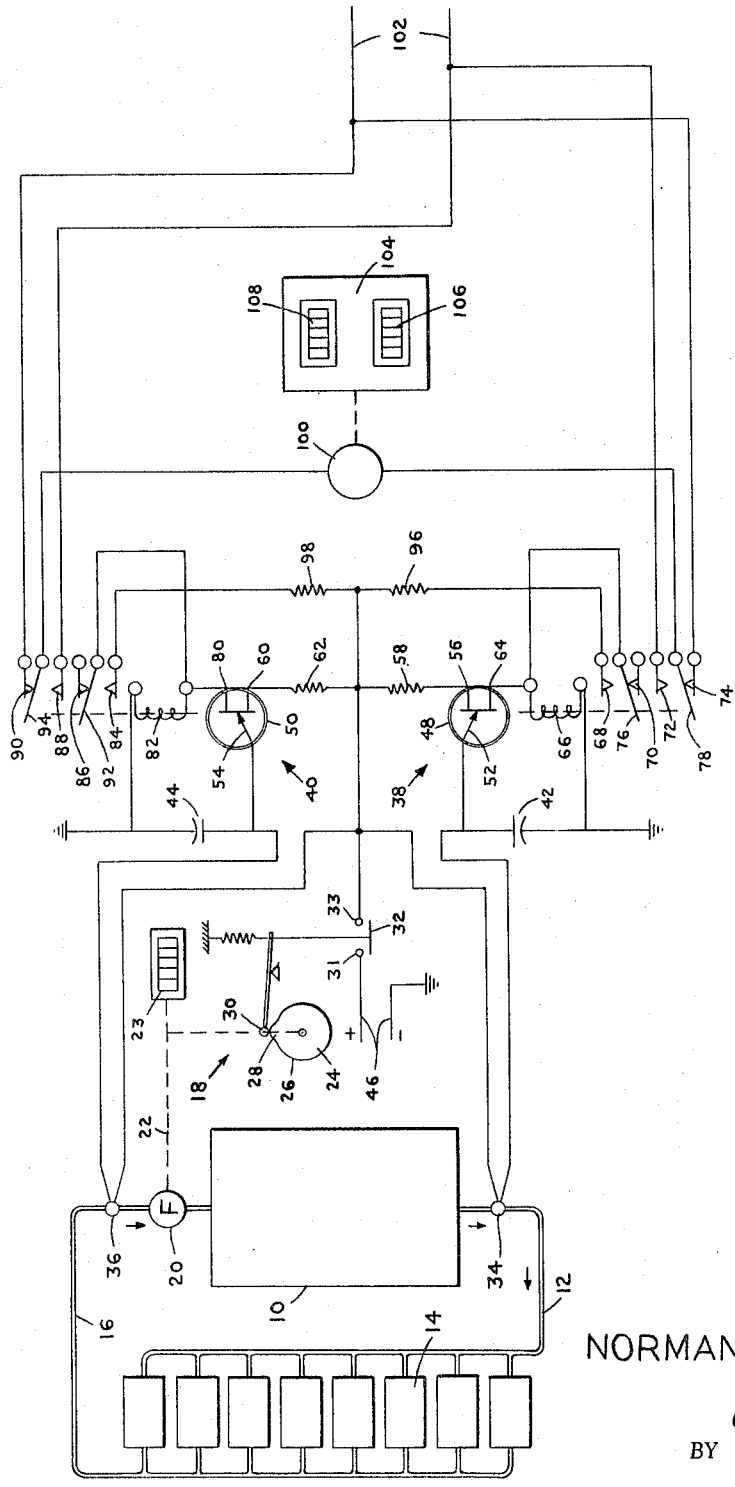
FIGURE 1 is a schematic diagram of the heat meter of the present invention.

In the drawings, there is shown heat measuring apparatus in the form of a B.t.u. meter for measuring the heat transferred between a heating and cooling means and a load. The B.t.u. meter is intended to provide the product of water mass flow (Q) times the temperature difference between incoming and outgoing water supply lines ($\Delta T$) or:

B.t.u. meter indication = $Q\Delta T$.

The B.t.u. meter of the present invention is usable wherever the rate flow of heat is of concern. For media other than water, however, third and fourth multipliers must be injected, that of the specific heat of the medium at constant pressure and the fluid specific gravity. In the case of fresh water, the specific heat varies from 1.009 at 32° F. to a low of 0.997 at 105° F. At 212° F. water has a specific gravity of 1.005. For practical considerations, the specific gravity and specific heat for water has been taken as 1.000 with the B.t.u. meter of the present invention.

In FIGURE 1, there is shown a cooling and heating generator 10 which is normally used in a "comfort conditioning" system for either heating or cooling. The generator 10 is capable of chilling water for summer use or heating the water for winter use. Water flows through suitable conduits 12 at the output of the generator 10 into room element conduits 14. After passing through the elements 14, the water is returned through a return conduit 16 to the generator 10. If the generator 10 has been operating as a water cooling generator, the liquid in conduit 12 will be colder than the liquid in conduit 16. Similarly, if the generator has been operating as a hot water heater, the liquid in conduit 12 will be warmer than the liquid in conduit 16.

The generator 10 has its heat output measured by heat measuring apparatus 18 built in accordance with the principles of the present invention. The heat measuring apparatus 18 includes a flow meter 20 which measures the pounds of liquid being supplied to the room elements 14. The flow meter 20 is a standard rotating water meter having a drive shaft 22 which is coupled to a flow counter 23 for indicating the quantity of water utilized in a conventional manner. The drive shaft 22 is also connected to a suitable cam 24 which will provide one full rotation for each pre-established unit of liquid measured by the flow meter 20. The cam 24 has a uniform surface 26 for approximately 350° of its circumference, with a raised portion 28 provided for the remainder of the circumference of the cam 24. A cam follower 30 rests on the cam surface of the cam 28 and is spring biased into engagement with the cam 24. The cam follower 30 is operatively connected to a suitable switch 32. When the cam follower 30 is on the raised portion 28 of the cam 24 the switch 32 is in the open position shown in FIGURE 1. When the cam follower 30 reaches the uniform radius portion 26 of the cam 24, the switch 32 will be closed.

A pair of temperature sensitive resistance elements 34 and 36 respectively are positioned in the conduits 12 and 16 to measure the temperature at opposite sides of the generator 10. The temperature sensitive resistance elements 34 and 36 could be thermistors. In a specific embodiment of the present invention, it was found that alloy wire such as Invar manufactured by the International Nickel Company, Therlo manufactured by Driver-Harris Company, and Carpenter manufactured by the Carpenter Steel Corporation, were especially useful in the present invention as they were extremely linear in their variation in resistance due to changes in temperature. These alloy wires were found to have a good positive coefficient of resistance characteristic, i.e., increases in temperature caused a corresponding linear increase in the resistance of the wires. The temperature sensitive resistance elements 34 and 36 each were connected to a suitable time delay circuit 38 and 40 respectively. The temperature sensitive resistance 34 was connected in series with a capacitor 42 between ground and contact 33 of switch 32. Temperature sensitive resistance element 36 was connected in series with a capacitor 44 between ground and the contact 33 of switch 32. The switch 32 had its other contact (31) connected to a source 46 of low voltage direct current.

Each of the time delay circuits 38 and 40 included a static switching element 48 and 50 in the form of a unijunction transistor. Unijunction transistor 48 has an emitter 52 connected to the ungrounded end of capacitor 42 while unijunction 50 has its emitter 54 connected to the ungrounded end of capacitor 44. Unijunction transistor 48 has one base 56 connected through a current limiting resistor 58 to terminal 33 of switch 32. Unijunction transistor 50 has its first base 60 connected through current limiting resistor 62 to terminal 33 of switch 32. The second base 64 of unijunction transistor 48 is connected through a suitable relay coil 66 and thence to ground. Relay coil 66 is the actuator of a double pole double throw switch having contacts 68, 70, 72 and 74 and switch poles 76 and 78. The second base 80 of unijunction 50 is connected through a relay coil 82 to ground. The relay coil 82 is the actuator of a double pole double throw switch including contacts 84, 86, 88, and 90 with switch poles 92 and 94.

Contact 68 is connected through a current limiting resistor 96 to switch contacts 32 and contact 84 is connected through a current limiting resistor 98 to switch 32. Switch pole 76 is connected to the ungrounded terminal of relay coil 66 so that when relay coil 66 is energized, switch pole 76 will close contact 68 to hold relay 66 in its energized position by completing a circuit to low voltage source 46. Similarly, switch pole 92, will close contact 84 after energization of relay coil 82 to hold relay coil 82 in its energized position by supplying low voltage D.C. power from source 46 through switch 32 and current limiting resistor 98.

Contacts 72 and 74 are considered the control contacts of the relay. When relay coil 66 is energized pole 78 bridges contact 72 to complete a circuit for a counter motor 100 through pole 94 and the control contact 90 associated with unenergized relay 82 to an alternating current source 102. Counter motor 100 controls a meter board 104 which includes a B.t.u. display counter 106 and a temperature difference display counter 108. The relay coil 82, when energized, opens contact 90 and pole 94 and connects pole 94 to contact 88 thus stopping the counter motor 100. If relay coil 82 had been energized prior to the energization of relay coil 66, a circuit would have been completed through pole 94 and control contact 88 through counter motor 100, pole 78, unenergized contact 74, to the A.C. source 102. The operation of the temperature measuring apparatus 18 is as follows:

If, the generator 10 is operating to cool water for the room elements 14 as would be expected during the summer, the conduit 12 would have cold water therein while the conduit 16 would have warm water. Thus, temperature sensing element 34 is sensing a lower temperature than temperature sensing element 36. The flow meter 20 upon rotation of its shaft will cause cam roller 30 to reach the uniform radius portion 26. When this occurs, switch 32 is closed supplying power from low voltage source 46 to the static switching elements 48 and 50. The characteristics of the unijunction transistors 48 and 50 are such that there is a high base to base resistance with no voltage on the emitter. Accordingly, relay coils 66 and 82 will not have current flowing therethrough and will be in the deenergized position shown in FIGURE 1.

When switch 32 is closed, current flows through the two timing circuits 38 and 40 comprising temperature sensing element 34 and capacitor 42; and temperature sensing element 36 and capacitor 44 respectively. Since the time delay of these circuits is dependent on the resistance of the temperature sensing elements 34 and 36 and since the temperature sensing elements 34 and 36 vary positively with respect to temperature, capacitor 42 will be charged to its peak point voltage (the voltage on the emitter 52 which will cause "firing" of the unijunction transistor 48) before capacitor 44 reaches the peak point voltage for unijunction transistor 50. This is due to the lower resistance of temperature sensing element 34 with respect to temperature sensing element 36 caused by the lower temperature in conduit 12.

When the peak point voltage is reached across capacitor 42, the resistance between base 56 and base 64 instantly falls from approximately 5000 ohms to 40 ohms. This increases the current flow through resistor 58 and relay coil 66 from low voltage source 46 and, at the same time, capacitor 42 will discharge through relay coil 66.

The energization of relay coil 66 closes pole 76 and contact 68 holding relay coil 66 in its energized position. Further, pole 78 closes contact 72 completing the energization circuit for counter motor 100.

As was stated previously, the time delay circuit 40 has a longer time delay than circuit 38. Accordingly, static switching element or unijunction transistor 50 does not have the peak point voltage applied to emitter 54 until a time later than the firing of unijunction transistor 48. When the peak point voltage is reached as determined by the resistance of temperature sensing element 36, capacitor 44 reaches the peak point voltage thus causing unijunction transistor 50 to fire and, in a manner similar to the firing of unijunction transistor 48, relay coil 82 is energized. When relay coil 82 is energized, pole 92 completes the hold circuit for relay coil 82 through contact 84. Further, pole 94 breaks the energization circuit for counter motor 100 by opening contact 90 and closing contact 88.

Accordingly, counter motor 100 has rotated to give a direct indication on meter 108 of the temperature difference during this unit measurement of the flow of water by meter 20. Display 106, has given an indication of the B.t.u. output of the generator 10 by multiplying the unit flow of water by the difference in temperature as determined by temperature sensing elements 34 and 36. When, the cam 24 has completed approximately 350 degrees of rotation, the cam follower 30 hits the raised portion 28 which opens switch 32. It should be understood that in measuring a unit of flow, the time of rotation of cam 24 is set longer than the longest anticipated time delay of time delay circuits 38 and 40. When the switch 32 is opened by movement of the cam follower 30 on the raised portion 28, relay coils 66 and 82 are simultaneously deenergized and returned to the initial position shown in FIGURE 1. As soon as the cam 24 rotates beyond the raised portion 28, the cycle starts again. Thus, for each unit of rotation of the flow meter 20, a temperature difference reading will be added on the B.t.u. display 106 to integrate the flow in pounds of water with respect to the difference in temperature. This summing up, need not be compensated for the specific gravity of water in view of the fact that this has previously been considered to be 1.000. For other liquids, compensation would be necessary of the meter 106. This display 108 is a continuous indication of the difference in temperature at any time between the liquid in conduit 12 and conduit 16.

It can easily be understood, that when the generator 10 operates as a hot water generator for winter use, the temperature sensing element 36 will be cooler than the temperature sensing element 34. Accordingly, time delay circuit 40 will have its static switching element 50 fire prior in time to static switching element 48 of time delay circuit 38. This will merely cause relay coil 82 to energize prior to the enerization of relay coil 66. Since the closing of pole 94 with contact 88 causes energization of counter motor 100, the operation is substantially similar to that discussed with respect to generator 10 in its summer use. The energization of relay 66 will open contact 74 so as to stop counter motor 100.

From the above, it can be seen that the FIGURE 1 embodiment is not dependent on a particular one of the input and output conduits being cold or hot, but is extremely versatile in that it can be used for all types of systems.

Figure 2:
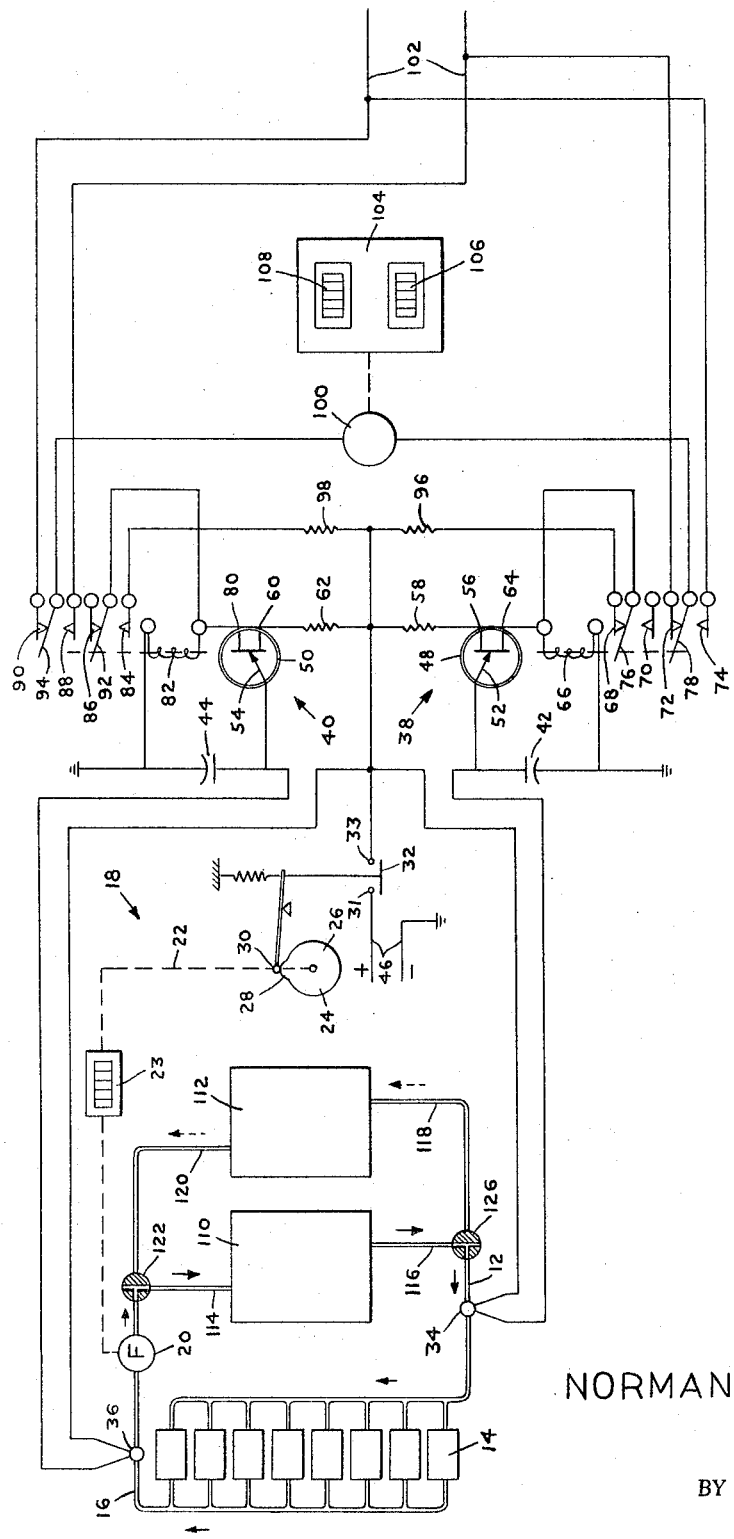
FIGURE 2 is a schematic diagram of a second embodiment of the present invention.

In FIGURE 2, there is shown the heat measuring apparatus 18 of the present invention utilized with a different type of air conditioning and heating system. That is, the generator 10 of FIGURE 1 has been substituted for by two generators 110 and 112. Generator 110 is an air conditioning generator and generator 112 is a heating generator. The air conditioning generator 110 has an inlet conduit 114 and an outlet conduit 116. Heating generator 112 has an inlet conduit 118 and an outlet conduit 120. The inlet conduit 114 of air conditioning generator 110 and the outlet conduit 120 of heating generator 112 are selectively connectable to conduit 16 through a three way valve 122. Valve 122 is shown connecting conduit 16 with air conditioning generator inlet conduit 114. In a second position of valve 122, outlet conduit 120 of heating generator 112 is connected to conduit 16 and inlet conduit 114 of air conditioning generator 110 is cut off. The flow of water in outlet conduit 20 has been shown by dotted arrow 124.

Outlet conduit 116 of air conditioning generator 110 and inlet conduit 118 of heating generator 112 are selectively connectable to conduit 12 by three way valve 126. Valve 126 is shown in FIGURE 2 with outlet conduit 116 connected to conduit 12. In a second position of three way valve 126, outlet conduit 116 is cut off, and inlet conduit 118 is connected to conduit 12. The flow of water through inlet conduit 118 is shown by dotted line 128.

It can thus be seen that by utilizing the valves 122 and 126 and the separate generators 110 and 112, conduit 12 will always be the cool lines while conduit 16 will always be the warm lines. Accordingly, it is not necessary to provide temperature sensing elements 34 and 36 which are linear over the entire range of temperatures, but non-linear resistances can be utilized if proper compensation is made in the timing circuits 38 and 40 for the non-linearity. This compensation can be achieved because of the known consideration that timing circuit 38 would always fire prior to the firing of timing circuit 40 since conduit 12 is always cooler than conduit 16.

In FIGURE 3, there is shown a third embodiment of the present invention in which there is provided a heat measuring apparatus 18' which includes an alarm and stand by circuit for indicating failure of the main heat measuring circuit. The heat measuring apparatus 18' includes a suitable cam operated switch 32' operated from a flow meter similar to the flow meter 20 of FIGURES 1 and 2. The switch 32' has one terminal connected to a terminal of two temperature sensitive elements 34' and 36' which form parts of two time delay circuits 38' and 40' respectively. The time delay circuits 38' includes a capacitor 42' in series with temperature sensing element 36' and time delay circuit 40' includes a capacitor 44' in series with tempeature sensing element 34'.

The juncture point between temperature sensing element 36" and capacitor 42' is connected to an emitter 52' of a static switching element 48' in the form of a unijunction transistor. Similarly, the juncture point between capacitor 44' and temperature sensing element 34' is connected to the emitter 54' of static switching element 50'.

One base element 56' of unijunction transistor 48' is connected in series with a current limiting resistance 58' to one terminal of switch 32'. Similarly, one base element 60" of unijunction transistor 50" is connected through a current limiting resistor 62' to the same terminal of switch 32'.

The other base 64' of unijunction transistor 48' is connected through a relay coil 66' to ground. The relay coil 66' has four contacts, 68', 70', 72' and 74' which are controlled by two poles 76' and 78'. The unijunction transistor 50' also has a base 80' connected through a relay coil 82' to ground. Relay coil 82' has four contacts 84', 86', 88' and 90' which are closed by two suitable poles 92' and 94'.

Contact 68' is connected through a current limiting resistor 96' to one terminal of switch 32' while contact 84' is connected through a current limiting resistor 98' to one terminal of switch 32'. Pole 94' is connected to a relay coil 130 having four contacts 132, 134, 136 and 138. Relay coil 130 also has two poles 140 and 142. Relay 130 is considered to be a thermal time delay relay as it has one coil end connected to a terminal 144 of a thermal switch 146 having a movable contact 148 therein. In its unactivated position, as shown in full line in FIGURE 3, thermal time delay switch 146 has its movable contact 148 in abutment with a fixed contact 150. The movable contact 148 is connected through pole 78', contact 74', contact 134, and pole 140 to one terminal of an A.C. source 102'. The other terminal of A.C. source 102' is not connected in series with the thermal time delay switch 146 so long as relays 82' and 66' remain deenergized.

A low voltage D.C. source 46' is connected through pole 142 and contact 138 to the switch 32'.

Pole 94' is additionally connected to counter motor 100' which is in series with fixed contact 150 of thermal time delay relay 146. Also, pole 94' is connected to the heater 152 of thermal time delay relay 146. A suitable glow tube 154 is placed in shunt relation to the heater 152 to indicate when the heater 152 is working properly or improperly.

Contact 136 of thermal relay 130 is connected to a stand by and alarm circuit 156. The stand by and alarm circuit 156 consists of an identical circuit to the circuit of measuring apparatus 18 of FIGURES 1 and 2 with the switch 32 being operated by the same flow meter as operates switch 32'. Additionally, a suitable light or alarm mechanism is provided in the circuit 156 to indicate to a service man that the main circuit has faulted.

The operation of the measuring apparatus 18' is as follows:

When the flow meter (not shown) closes switch 32', the temperature sensing elements 34' and 36' sense the temperature at the inlet and outlet conduits of the generator (not shown) in the manner discussed with respect to FIGURES 1 and 2. Assuming temperature sensing element 36' to be sensing the colder liquid, unijunction transistor 48' will fire more quickly as the voltage on capacitor 42' will reach the peak point voltage more quickly than the voltage on capacitor 44'. Upon firing, unijunction transistor 48' will conduct and relay 66' will be energized completing a holding circuit for coil 66' from ground through coil 66', pole 76', contact 68', switch 32', contact 138, pole 142, to low voltage D.C. source 46'. The other pole 78' will close contact 72' to complete a circuit through contact 72', pole 78', the moving contact 148 and fixed contact 150 of thermal time delay switch 146, counter motor 100', pole 94', contact 90', contact 134, pole 140, to the other line of A.C. source 102'.

When time delay circuit 40' causes unijunction transistor 50' to fire, relay coil 82' is energized and held by reason of the closed circuit between the ground, relay coil 82', pole 92', contact 84', current limiting resistor 98', switch 32', contact 138, pole 142, to low voltage D.C. source 46'.

The other pole 94' breaks the counter motor 100' energization circuit thus stopping the counter in the manner discussed with respect to FIGURES 1 and 2. When the switch 32' is opened by the cam associated with the flow meter shown in FIGURES 1 and 2, the relay coils 66' and 82' are deenergized and the measuring apparatus 18' is ready for a second unit measurement of differential temperature. If, one of the switches 48' and 50' does not energize its associated relay coil 66', 82' the thermal time delay switch 146 takes over. This switch 146 has a time delay greater than any expected time delay of the time delay circuits 38', 40'. When the switch 146 has been heated to the point that movable contact 148 touches fixed contact 144, it breaks the circuit for motor counter 100' and energizes a circuit for thermal relay 130. Thermal relay 130, in moving its poles 140, 142 deenergizes the measuring apparatus 18'. Pole 142 will open the circuit from low voltage source 46' to switch 32' thus preventing operation of the time delay circuit 38', 40' and relays 66' and 82'. Further, pole 142 closes the circuit to contact 136 thus providing low voltage D.C. power to the stand by and alarm circuit 156. Pole 140 will connect one line of A.C. source 102' to contact 132 and thence through lines 158 to the stand by and alarm circuit 156. Line 158 is connected to contacts similar to contacts 74' and 90' of measuring apparatus 18'. Thus, it can be seen, that if measuring apparatus similar to measuring apparatus 18 is incorporated in the stand by and alarm circuit 156, it will only be energized when the thermal time delay relay 146 senses a fault in the measuring apparatus 18'. Upon such fault, an alarm signal is provided. Additionally, the heat being produced by the generator is continuously measured so that no error will occur. As soon as someone is able to fix the circuit 18', the apparatus would be restored to its initial condition.

The present invention may be embodied in other specific forms without departing from the spirit or essential attributes thereof and, accordingly, reference should be made to the appended claims rather than to the foregoing specification as indicating the scope of the invention.

I claim as my invention:

1. Measuring apparatus comprising flow measuring means for measuring the flow of a liquid which is to be heated or cooled by a generator, a first temperature sensor adapted to be positioned to measure the temperature of a liquid supplied to the generator, a second temperature sensor adapted to measure the temperature of the liquid as it leaves the generator, temperature difference sensing means controlled by said flow measuring means and by the difference in temperature between the temperature sensed by said first sensor and the temperature sensed by said second sensor, integration means controlled by said temperature difference sensing means for adding up temperature difference sensing means output signals caused by said temperature difference, said flow measuring means activating said temperature difference sensing means to feed a temperature difference sensing means output signal to said integration means for a unit of liquid flow measured by said flow measuring means, and said temperature difference sensing means including a first and a second time delay circuit, said first time delay circuit being controlled by said first sensor to produce an output signal after a period determined by the temperature sensed by said first sensor, and said second time delay circuit being controlled by said second sensor to produce an output signal after a time delay determined by the temperature sensed by said second sensor.

2. The measuring apparatus of claim 1 wherein said flow measuring means measures the weight of liquid which is to be heated or cooled, said integration means being compensated by the specific gravity and specific heat of the liquid to provide an output which measures the quantity of heat supplied by the generator to the liquid.

3. The measuring apparatus of claim 1 wherein said integration means being operative to add up the time difference between the production of an output signal by one of said time delay circuits and the production of an output signal by the other of said time delay circuits.

4. The measuring apparatus of claim 3 wherein said first and second time delay circuits include first and second capacitance elements respectively, said first and second temperature sensors being temperature sensitive resistance elements, said first and second temperature sensitive resistance elements being in circuit relation with said first and second capacitive elements respectively to control the time delay of said first and second time delay circuits respectively.

5. The measuring apparatus of claim 4 wherein said first and second time delay circuits include first and second static switching elements, said first and second static switching elements being controlled by said capacitive elements to produce an output signal after a predetermined voltage buildup of said capacitive elements, said first and second static switching elements being further operative to discharge said first and second capacitive elements in preparation for a next temperature difference sensing means output signal.

6. The measuring apparatus of claim 5 wherein said time delay circuit includes switching means for connecting a power supply to said static switching elements, said flow measuring means being operative to operate said switching means to connect said power to said static switching elements after measuring a unit of liquid flow and to disconnect said power from said static switching elements after said integration means has added up said temperature difference sensing means output signals and before the next unit of liquid flow has been measured by said flow measuring means.

7. The measuring apparatus of claim 6 wherein said flow measuring means includes a rotating cam, said switching means including a switch, said rotating cam being operative to maintain said switch in one position for connecting said power to said static sensing elements, said cam being operative to move said switch to a second position for disconnecting said power from said static sensing elements.

8. The measuring apparatus of claim 1 wherein said integration means is a counter, said temperature difference sensing means output signal being operative to activate said counter in accordance with the temperature difference measured by said first and second sensors for each unit of liquid flow measured by said flow measuring means.

9. The measuring apparatus of claim 1 further comprising, an alarm circuit, said alarm circuit being operative to provide an alarm signal upon failure of said temperature difference sensing means.

10. Measuring apparatus comprising liquid flow measuring apparatus for continuously measuring the flow of liquid from a heat generator, temperature difference sensing means measuring the difference in temperature in liquid supplied to the generator and liquid flowing out of the generator, integration means controlled by said temperature difference sensing means and said flow measuring means for adding up temperature difference signals measured during a unit flow of liquid measured by said flow measuring means, and an alarm circuit, said alarm circuit being operative to provide an alarm signal upon failure of said temperature difference sensing means, said temperature difference sensing means including a first and second time delay circuit, said first and second time delay circuits being respectively responsive to the temperature of the liquid supplied to said heat generator and to the liquid leaving said heat generator, said alarm circuit including a third time delay circuit, said third time delay circuit having a longer time delay than the normally anticipated time delay of said first and second time delay circuits.

11. The measuring apparatus of claim 10 wherein said flow measuring means is operative to activate said temperature difference sensing means to feed a temperature difference sensing means output signal to said integration means for a unit of liquid flow measured by said flow measuring means, said flow measuring means being operative to deactivate said temperature difference sensing means before the next unit of liquid flow has been measured by said flow measuring means, the time delay between the activation of said temperature difference sensing means and the deactivation of said temperature sensing means being greater than the time delay of said third time delay circuit.

References Cited by the Examiner
UNITED STATES PATENTS 2,359,767  10/1944  Keinath _____ 73—193 X
2,691,889  10/1954  Dion et al. _____ 73—342

RICHARD C. QUEISSER, Primary Examiner.

J. C. GOLDSTEIN, Assistant Examiner.